Dec. 9, 1924.

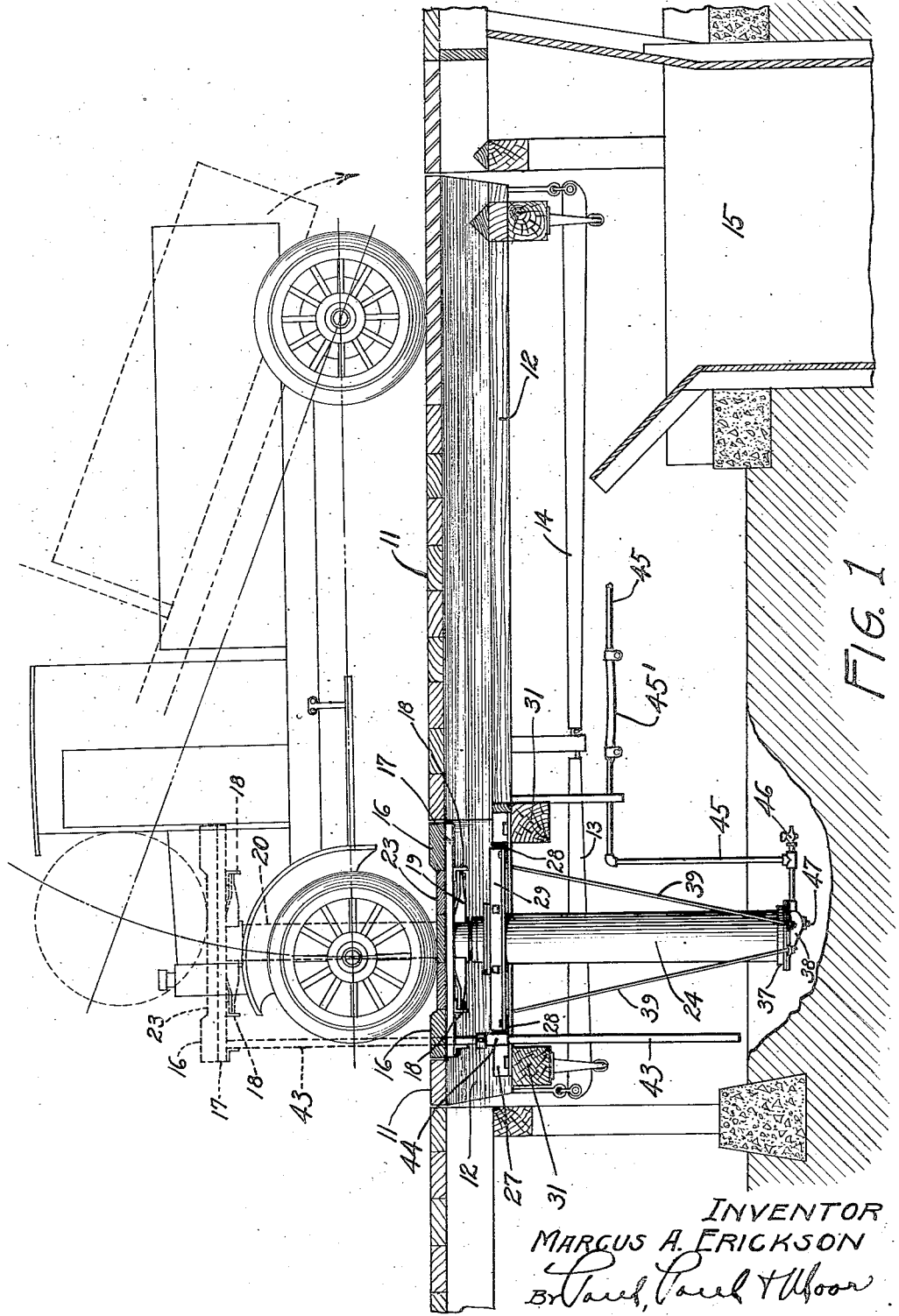

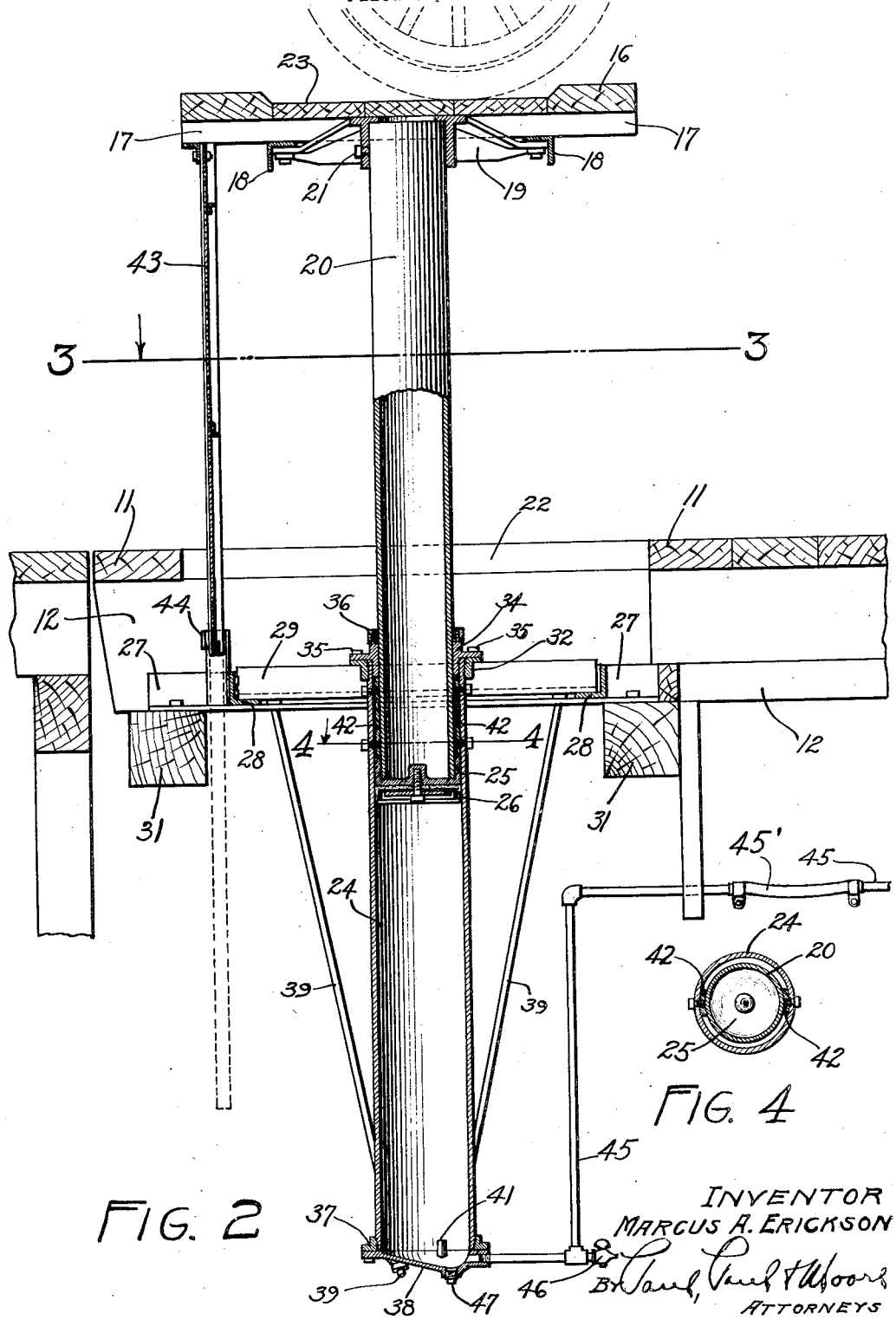

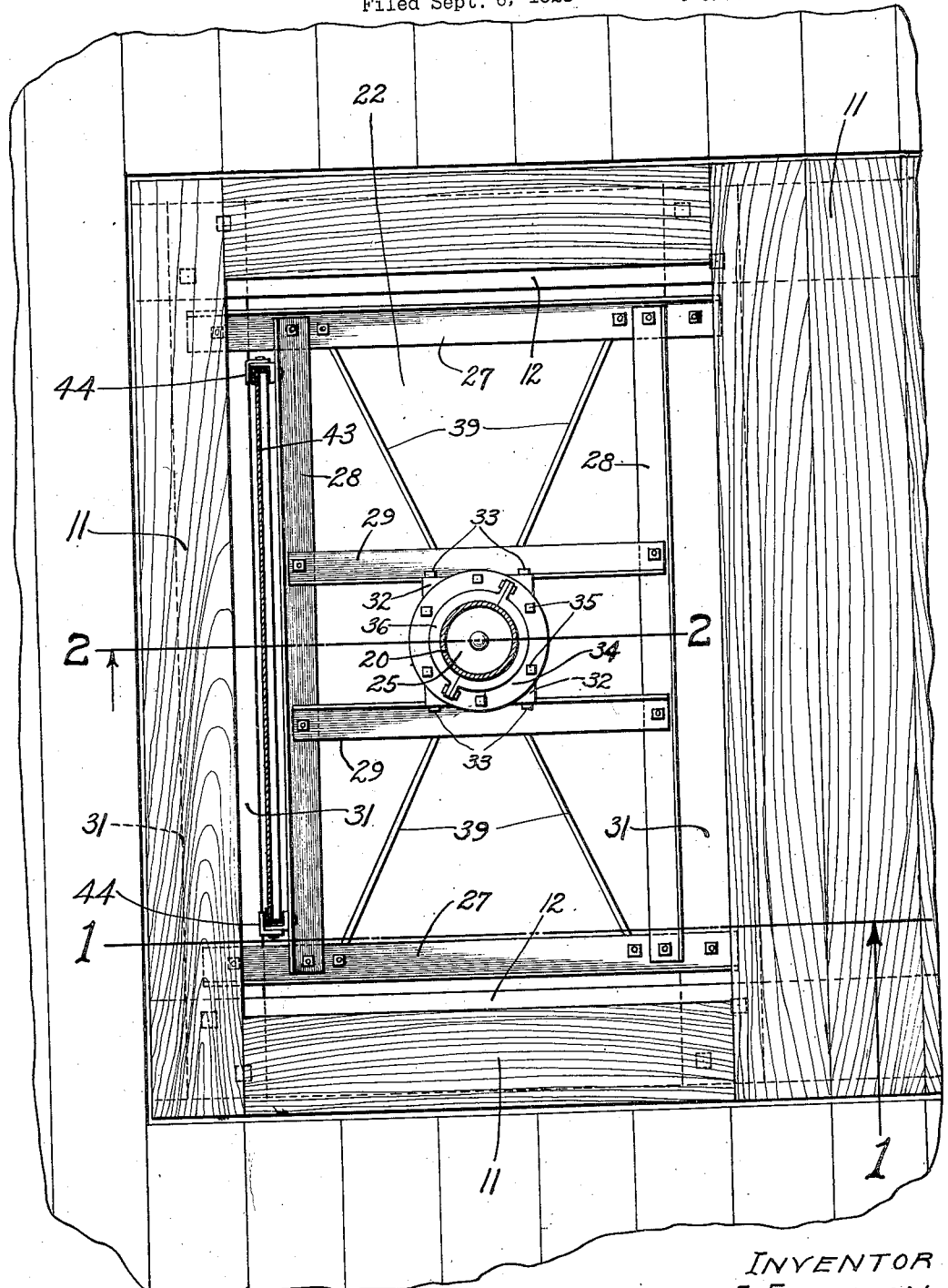

M. A. ERICKSON

DUMPING PLATFORM

Filed Sept. 6, 1923

INVENTOR
MARCUS A. ERICKSON

ATTORNEYS

Patented Dec. 9, 1924.

1,518,780

UNITED STATES PATENT OFFICE.

MARCUS A. ERICKSON, OF MINNEAPOLIS, MINNESOTA, ASSIGNOR TO STRONG-SCOTT MFG. CO., OF MINNEAPOLIS, MINNESOTA, A CORPORATION OF MINNESOTA.

DUMPING PLATFORM.

Application filed September 6, 1923. Serial No. 661,196.

*To all whom it may concern:*

Be it known that I, MARCUS A. ERICKSON, a citizen of the United States, resident of Minneapolis, county of Hennepin, and State of Minnesota, have invented certain new and useful Improvements in Dumping Platforms, of which the following is a specification.

This invention relates to improvements in dumping platforms such as are commonly employed to elevate the forward end of a truck or other vehicle, for the purpose of unloading or discharging the load therefrom, and more particularly relates to such platforms adapted for use in conjunction with platform scales.

The object of this invention is to provide a lifting or dumping platform operable in conjunction with a platform scale to elevate the forward end of a motor truck, wagon or sleigh when positioned thereon, so that the load thereon may be quickly and conveniently discharged into a suitable receiving means usually provided beneath the platform scale.

A further object is to provide a platform scale having a dumping platform arranged at one end thereof and supported entirely clear of the ground by the movable or weighing portion of the platform scale, and hence not in danger of being thrown out of alinement or in any way affected by the action of frost or settling of the scale frame.

A further object is to provide a dumping platform adapted to vertical movement by means of a piston, mounted for reciprocal movement, within a complementary cylinder secured to the scale platform.

A further object is to provide a dumping platform having a guard secured to the forward side thereof and adapted for vertical movement simultaneously with the platform to prevent wagon draft horses from getting their hind legs under the platform and also to prevent rotation of the platform when in elevated position.

A further object is to provide a dumping platform of very strong and substantial construction, its supporting piston rod preferably being of large diameter to prevent it from binding when lifting a heavy load, should it be unequally distributed upon the surface of the platform.

A further object is to provide a dumping platform of very simple and inexpensive construction, comprising very few parts, and also one that may be readily adapted for use in conjunction with an ordinary platform scale.

Other objects will more fully appear from the following description and the accompanying drawings and will be pointed out in the annexed claims.

In the drawings, there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 1 is a vertical sectional view on the line 1—1 of Figure 3, showing a platform scale with my invention applied thereto;

Figure 2 is an enlarged sectional view on the line 2—2 of Figure 3, showing the dumping platform in elevated position and also showing how its supporting means are secured directly to the side rails of the movable portion of the platform scale;

Figure 3 is a horizontal sectional view on the line 3—3 of Figure 2, showing the rectangular cylinder supporting frame secured to the beams of the platform scale, and also showing the means provided for vertically guiding the guard in its up and down movement;

Figure 4 is a cross-sectional view on the line 4—4 of Figure 2, showing the means provided for limiting the upward movement of the piston and platform;

Figure 5:
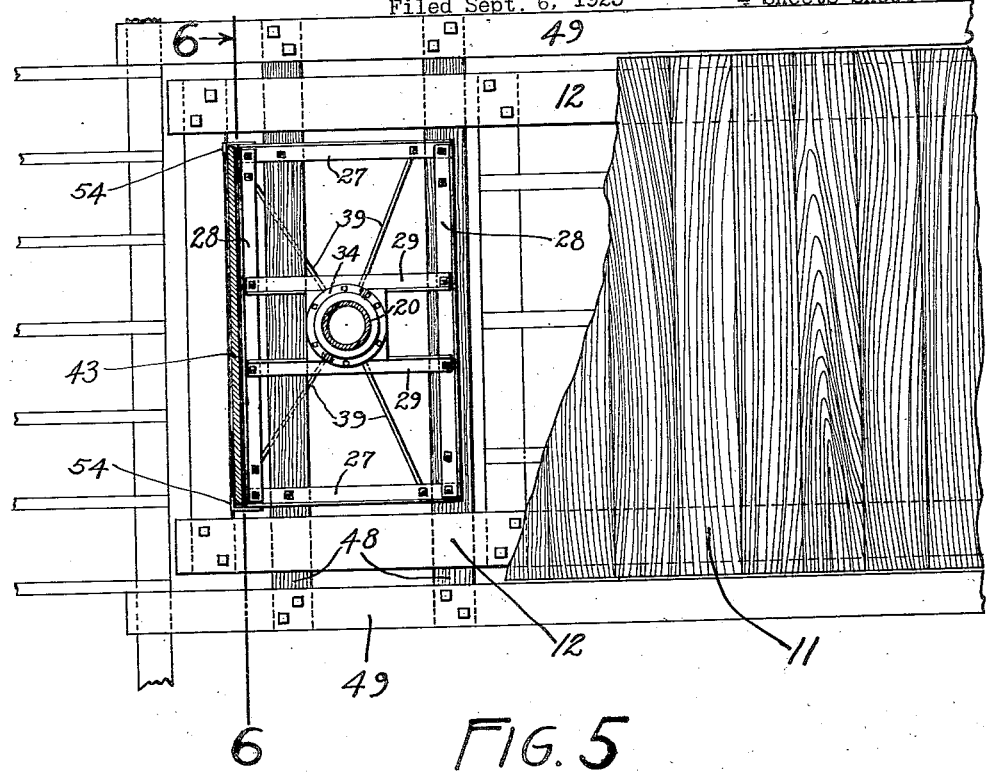
Figure 5 is a plan view of a platform scale equipped with a dumping platform at one end thereof, showing a modified construction wherein the cylinder and platform lifting mechanism is supported independently of the scale platform.

In the selected embodiment of the invention here shown, there is illustrated a platform scale of the type ordinarily employed in conjunction with grain elevators for weighing and unloading grain from a truck or other vehicle. As here shown, the scale comprises a weighing platform 11 mounted upon the usual side rails 12, supported by means of the usual scale beams 13 and 14. The central rear portion of the platform 11 is preferably constructed in such a manner that the grain may be discharged therethrough into a receiving hopper 15 usually provided beneath the platform.

A feature of this invention resides in the provision of a fluid pressure operated dumping or lifting platform at the forward end of the weighing platform 11, which, when in normal position, constitutes a portion of the platform 11. This platform 16 is suitably secured to a pair of beams 17 mounted, preferably, upon a pair of angle bars 18, supported by a spider 19 which is terminally mounted upon the upper end portion of a piston rod 20 and preferably secured thereto by a suitable screw 21. An elongated opening 22 is formed in the weighing platform 11, adapted to receive the dumping platform 16 therein when in normal position, as shown in full lines in Figure 1. When thus positioned, each end of the platform 16 will be supported upon the inner upper corners of the side rails 12, as clearly shown in Figure 3, and it will also form a portion of the forward end of the weighing platform 11. The upper surface of the platform 16 is preferably depressed, as shown at 23 in Figures 1 and 2, to prevent the wheels from accidentally rolling off the platform when in elevated position, should the brakes be released from the rear wheels. This depression, however, may be eliminated, if desired.

A complementary cylinder 24 is positioned beneath the dumping platform 16 adapted to receive the lower end portion of the piston rod 20. A piston head 25, having a suitable leather cup or packing 26 secured thereto, is terminally secured to the lower end portion of the piston rod in order to prevent leakage of air around the piston head when elevating the piston rod and platform 16.

An important feature of this invention is the novel method employed in supporting the cylinder 24, and therefore the piston rod and platform 16. As shown in the drawings, the cylinder is supported by means of a rectangular frame constructed, preferably of side angle bars 27, front and rear bars 28 and the cross bars 29. This frame is suitably secured to a pair of cross members 31 secured to the underside of the side rails 12 of the movable weighing platform 11. A cylinder collar 32 is secured to the upper terminal end of the cylinder 24. This collar is adapted to fit between the cross bars 29 and is preferably secured thereto by bolts 33. A piston rod guide bearing 34 is secured to the cylinder collar 32 by suitable bolts 35, and a stuffing box 36, preferably split, is provided at the upper end of the guide bearing 34 which may be packed with a suitable lubricant for the purpose of lubricating the piston rod during its reciprocal movement within the guide bearing and cylinder. A cylinder base ring 37 is terminally mounted upon the lower end of the cylinder and has a base cap 38 suitably secured thereto. Brace rods 39 have their lower ends secured to the cylinder base cap 38 and their upper ends to the side bars 27 of the rectangular frame, thereby rigidly supporting the lower end portion of the cylinder, depending into the usual pit provided beneath the scale platform but clear of the ground. An integral stop lug 41 is preferably provided upon the inner surface of the base cap 38 adapted to limit the downward movement of the piston and piston head to prevent the leather cup or packing 26 from engaging the base cap, which might result in serious damage thereto. Suitable stop bars 42 are also secured to the upper inner surface of the cylinder wall, as shown in Figures 2 and 4, to limit the upward movement of the piston and piston head.

Means are also provided at the forward end of the scale platform to prevent draft horses from getting into the pit beneath the platform when the dumping platform 16 is in elevated position, as shown in full lines in Figure 2 and dotted lines in Figure 1. Such means consist in the provision of a guard 43 suitably secured to the beams 17 of the lifting or dumping platform 16 and depending therefrom through the opening 22 and into the pit beneath the scale platform. Suitable guides 44 are secured to the front angle bar 28 of the cylinder supporting frame and function in vertically guiding the guard 43 in its up and down movement when the platform 16 is being raised or lowered. Thus, by the employment of this foot guard, in conjunction with the dumping platform and scale, it will be impossible for a horse to step into the opening 22 when unloading or discharging the load from a horse-drawn vehicle.

The foot guard 43 also functions in another capacity in that it provides a very simple and practical means for preventing the dumping platform 16 and piston rod 20 from relative rotation with reference to the weighing platform 11, when in elevated position. As hereinbefore stated, and as shown in Figure 2, the foot guard 43 is rigidly secured to the beams 17 of the raising platform 16, thereby raising and lowering simultaneously with the platform 16. The lower portion of the guard 43 is always in engagement with the guides 44, and it will therefore be readily seen that it will be impossible for the platform 16 to rotate upon its supporting means, and also that it will always be guided back into proper place within the opening 22 of the scale platform 11.

A pipe 45 is connected to the base cap 38 of the cylinder 24 and leads to a suitable source of air supply and air controlling means, not shown. A flexible connection 45' is preferably provided in the pipe 45 to allow freedom of movement of the movable weighing portion of the platform without affecting the fluid pressure supply pipe. A blow-off cock 46 is provided in the pipe 45 and a drain plug 47 is also preferably provided in the base cap 38, as shown in Figure 2.

From the foregoing, therefore, it will be readily seen that the outstanding feature of this invention resides in the novel construction employed in rigidly supporting from the movable or weighing portion of the platform scale, a cylinder and piston, adapted to vertically lift a portion of the scale platform. By thus suspending the lifting mechanism directly from the side rails of the platform scale, such mechanism becomes a part of the weighing platform of the scale and thereby does not interfere with the accurate weighing of the scale, which is often the case when using a dumping platform scale, having a cylinder rigidly mounted on the ground or pivotally mounted on the scale and adapted to either raise a portion of the scale platform or to tilt the entire platform.

The piston rod shown in this invention is also preferably of large diameter, thereby providing a very strong and substantial support for the platform 16, which, when lifting a heavy load, will not bind in its bearing, even though the load may be placed upon one side of the platform. Also by employing the foot guard as a means to prevent the platform and piston rod from relative rotation, I am enabled to greatly simplify the construction of the apparatus, and thereby reduce the cost of manufacturing.

There are other types of dumping platform scales in use at the present time which have the lifting or tilting mechanism mounted upon a foundation provided in the bottom of the pit. These latter types have not proven very satisfactory owing to the difficulty experienced in preventing the movable or weighing portion of the scale platform from contacting with the stationary or lifting mechanism and thereby causing the scale to become inaccurate. The above difficulty is caused by the foundation, upon which the lifting mechanism is supported, relatively changing its position with reference to the weighing platform through the action of frost, or through the settling of the scale frame and supports. Such platforms also require considerable time and labor to install and are therefore more or less impractical.

Figure 6:
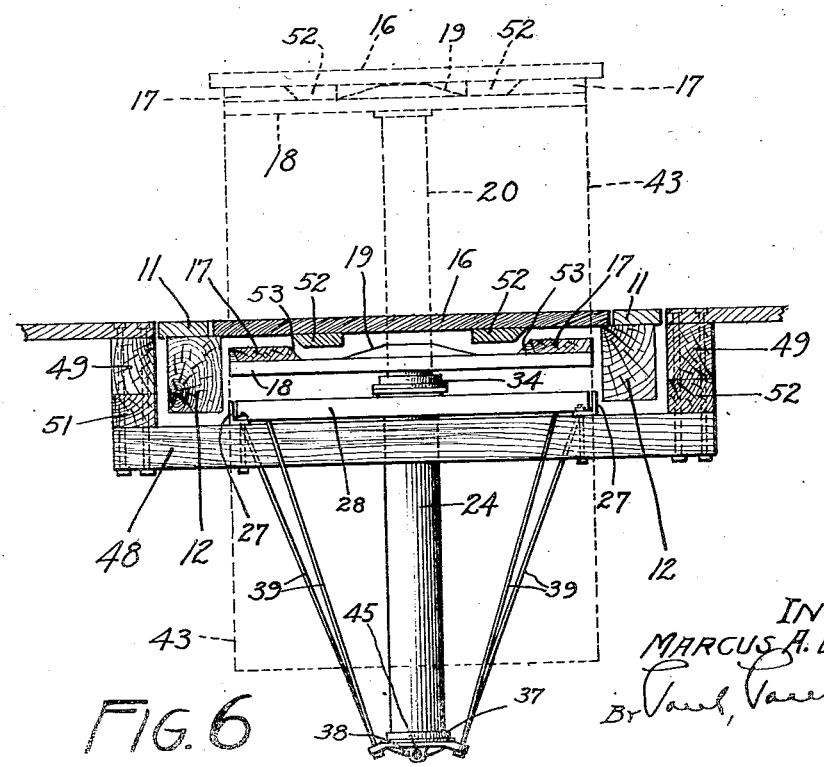
Figure 6 is a transverse sectional view on the line 6—6 of Figure 5, showing the platform in normal position and the lifting mechanism out of engagement therewith.

In Figures 5 and 6, there is shown a modified construction wherein the platform lifting mechanism is supported independently of the movable or weighing portion of the platform scale. As here shown, the rectangular frame, to which the cylinder is secured, is mounted upon a pair of cross members 48 which have their ends secured to the stationary side beams 49 provided at each side of the weighing platform. Spacing blocks 51 are interposed between the cross members 48 and the side beams 49, adapted to properly space the cross members from the lower face of the side rails 12 of the movable platform 11, for the purpose of preventing interference therewith, which would render the scale inaccurate.

Referring to Figure 6, it will also be noted that the lifting platform 16, when in normal position as shown in full lines, is disconnected from the lifting mechanism and is supported upon the side rails 12—12 of the weighing platform, thereby forming a portion thereof and in no way interfering with the weighing of the scale. Beveled cleats or cross pieces 52 are preferably secured to the underside of the lifting platform 16, adapted to cooperate with the inner beveled surfaces 53 of the beams 17 to prevent the platform from relatively changing its position upon the lifting mechanism when elevating a load.

In this construction the foot guard 43 can be secured to the platform 16, and not to the beams 17, as shown in Figures 1 and 2. Suitable guides 54 are provided on the side bars 27 to similarly guide the foot guard in its up-and-down movement.

I claim as my invention:

1. In combination with a weighing scale platform and a vertically movable section thereof adapted to support the forward portion of a vehicle, means suspended clear of the ground below said platform for raising and lowering said section, and the forward portion of the vehicle thereon.

2. In combination with a weighing scale platform and a vertically movable section thereof adapted to support the forward portion of a vehicle, means suspended from said platform for raising and lowering said section and the forward portion of the vehicle thereon.

3. In combination with a weighing scale platform and a vertically movable section, a fluid pressure cylinder rigidly suspended beneath said platform and a piston for said cylinder connected with said movable section for raising and lowering it independently of said scale platform.

4. A weighing scale platform having a vertically movable section adapted to support the forward portion of a vehicle, and mechanism supported clear of the ground and connected with said section for raising or lowering it and the vehicle thereon.

5. A weighing scale platform having a section thereof mounted for vertical movement and adapted to support the forward wheels of a vehicle, means for raising and lowering said section, and a guard device mounted to be raised and lowered with said section for the purpose specified.

6. A weighing scale platform having a vertically movable section adapted to support the forward portion of a vehicle, mechanism for raising and lowering said section, and a guard connected with the forward portion of said section and raised and lowered by the vertical movement thereof, said guard closing the gap on one side beneath said section when it is in its raised position.

7. A weighing scale platform having a vertically movable section adapted to support the forward portion of a vehicle, mechanism for raising and lowering said section, and means closing the gap on one side beneath said movable section and preventing rotary movement of said section during the up and down movement.

8. A weighing scale platform having timbers and an opening above said timbers and a section of the platform fitting said opening and adapted to be raised and lowered, a cylinder rigidly supported by said timbers and depending within the space beneath the opening in said platform and connected with a source of fluid pressure supply, a piston mounted to slide within said cylinder and having its upper end connected with the under side of said section for raising and lowering it, said section being adapted to support the forward portion of a vehicle that is tilted when said section is raised.

In witness whereof, I have hereunto set my hand this 1st day of September, 1923.

MARCUS A. ERICKSON.